United States Patent [19]

Broadt

[11] 4,324,543
[45] Apr. 13, 1982

[54] PHOTOFLASH ARRAY WITH SELECTIVE PAIRING OF LAMPS AND SWITCHING OF COMMON CIRCUIT

[75] Inventor: David R. Broadt, Lewisburg, Pa.

[73] Assignee: GTE Products Corporation, Stamford, Conn.

[21] Appl. No.: 156,991

[22] Filed: Jun. 6, 1980

[51] Int. Cl.³ .............................................. F21K 5/02
[52] U.S. Cl. ...................................... 431/359; 362/6; 362/15
[58] Field of Search ................. 431/359; 362/4, 6, 11, 362/13, 15

[56] References Cited

U.S. PATENT DOCUMENTS 4,017,728 4/1977 Audesse et al. ..................... 431/359
4,048,487 9/1977 Kewley ............................... 431/359

*Primary Examiner*—Carroll B. Dority, Jr.
*Attorney, Agent, or Firm*—Edward J. Coleman

[57] ABSTRACT

A photoflash lamp array having a plurality of 2n flashlamps, a plurality of n selective terminal means, each associated with a respective pair of the lamps and connected to one lead-in wire of each of the lamps of the associated pair, and a common terminal associated with all of the 2n lamps but directly connected to the other lead-in wire of one lamp of each pair. A respective normally open switch is coupled between the common terminal and a lead-in wire of the other lamp of each pair, so that the n normally open switches are coupled between the common circuit lead-in wires of associated pairs of the 2n lamps. Each of the switches is responsive to the flashing of the directly connected lamp of an associated pair so as to electrically connect the other lamp of the pair to the common terminal. In one specific example, ten lamps are selectively paired to be operated sequentially by firing pulses successively applied to five selective terminals together with a common terminal.

8 Claims, 1 Drawing Figure

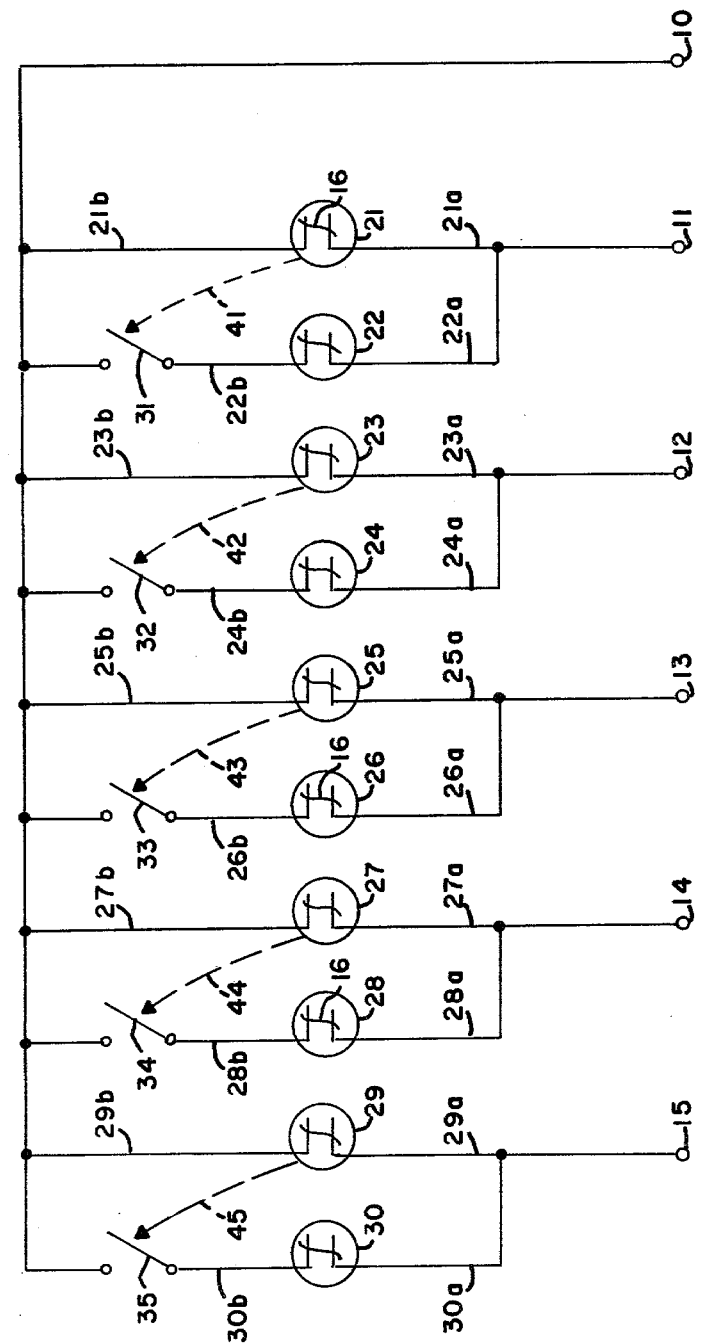

PHOTOFLASH ARRAY WITH SELECTIVE PAIRING OF LAMPS AND SWITCHING OF COMMON CIRCUIT

BACKGROUND OF THE INVENTION

This invention relates to photoflash lamp arrays having circuit means for causing a different lamp to be flashed upon each occurrence of a firing pulse produced in synchronism with the opening of a camera shutter.

Numerous multilamp photoflash arrangements with various types of sequencing circuits have been described in the prior art. Series and parallel-connected lamp arrays have been shown which are sequentially fired by mechanical switching means, simple electrical circuits, switching circuits using the randomly varied resistance characteristics of the lamps, arc gap arrangements, complex digital electronic switching circuits, light-sensitive switching means and heat-sensitive switching devices which involve melting, fusing or chemical reaction in response to the radiant energy output of an adjacently located flashlamp.

One currently marketed eight-lamp photoflash unit employing radiation switches is described in U.S. Pat. Nos. 3,894,226 and 4,017,728 and referred to as a flip flash. A ten-lamp version is described in U.S. Pat. Nos. 4,156,269 and 4,164,007. The unit comprises a planar array of high voltage flashlamps mounted on a printed circuit board with an array of respectively associated reflectors. Circuitry on the board includes a plurality of solid state switches that chemically change from a high to low resistance, so as to become electrically conducting after exposure to the radiant heat energy from an ignited flashlamp operatively associated therewith. The lamps of the array are arranged in two equal groups disposed in the upper and lower halves respectively of the rectangular-chaped circuit board. A pair of terminal contacts at the lower end of the unit is provided for activation of the upper group of lamps while a set of terminal contacts at the top of the unit is operatively associated with the lower group of lamps. The application of successive high-voltage pulses (e.g., 500 to 4,000 volts from, say, a piezoelectric source controlled by the shutter of a camera in which the array is inserted) to the terminal contacts at the lower end of the unit causes the lamps at the upper half of the array to be sequentially ignited. The array is then turned end for end and again inserted into the camera in order to flash the remaining group of lamps. In the flip flash unit, therefore, all of the lamp sequencing circuitry is self-contained in the removable photoflash unit, and the only function of the camera is to produce successive firing pulses in response to actuation of the camera shutter.

Another type of multilamp photoflash array currently on the market employs lamp-reflector units in linear rows facing in opposite directions, such as described in U.S. Pat. Nos. 3,598,984; 3,598,985; and 4,032,769 and referred to as a flash bar. Typically, such linear photoflash lamp arrays comprise a total of ten lamps arranged in two parallel rows of five lamps each, the lamps and reflectors of one row being staggered relative to the lamps and reflectors of the other row. The five lamps facing in one direction are connected to a respective firing circuit disposed on one side of a printed circuit board having a plug-in tab, and the five lamps facing in the opposite direction are connected to a respective firing circuit on the opposite side of the printed circuit board. Each of the lamps has a pair of lead-in wires, one of which is connected to a common circuit run which leads to a common terminal on the plug-in tab, while the other lead-in wire of each of the lamps of a group of five facing in one direction are connected to respective conductor runs leading to a set of five selective terminals on the respective side of the circuit board tab, e.g., see the aforementioned patent 3,598,985. The circuitry of this prior art flash bar unit contains no switching elements; hence, as described, for example, in U.S. Pat. Nos. 3,618,492 and 3,757,643, one-at-a-time sequencing of the five lamps facing in one direction is provided by sequential application of low voltage firing pulses across the associated common terminal and successive ones of the associated selective terminals. That is, when the linear flash bar array is plugged into a camera, each time the shutter is actuated, electronic switching circuitry in the camera successively applies firing pulses in sequence to the five selective terminals (and associated common terminal) on the side of the circuit board to which the five lamps facing the camera subject are connected. When the five lamps facing in one direction are expended, the flash unit must be removed from the camera, rotated 180 degrees, and then reinserted in the camera circuit so that the five unused lamps are connected to the camera switching circuitry.

In the interests of compactness, simplicity of operation, and increasing the number of flash illuminated photographs that may be taken in rapid succession, it is desirable to provide a multilamp photoflash array in which all of the lamps face in the same direction and only a single set of connector terminals is required, so that removal and reorientation of the flash unit is unnecessary. Further, it is particularly desirable to provide a photoflash lamp array which is compatible with existing camera circuitry.

SUMMARY OF THE INVENTION

Accordingly, it is an object of the present invention to provide a photoflash lamp array having improved circuit means for permitting reliable flashing of all of the lamps of the array in a predetermined sequence in response to firing pulses applied to a single set of terminal means.

A principal object of the invention is to provide an improved switching circuit for an array of photoflash lamps which is adapted for operation by a firing pulse switching circuit capable of sequencing only one half of the total number of lamps of the array but including a monitoring function for pretesting unexpended lamps.

These and other objects, advantages and features are attained, in accordance with the invention, by a photoflash lamp array having circuit means for sequentially flashing pairs of lamps (one lamp at a time) in the array using only one selective terminal per lamp pair together with a common circuit terminal. The array comprises: a plurality of 2 n flashlamps, each having first and second lead-in wires; a plurality of n selective terminals means, each associated with a respective pair of the 2 n lamps and electrically connected to the first lead-in wire of each of the lamps of the respective pair; and a common terminal means associated with all of the 2 n lamps and directly connected in electrical circuit to the second lead-in wire of one of the lamps of each of the respective pairs of lamps. The array further includes a plurality of n normally open switches, each coupled an electrical circuit between the common terminal and the second lead-in wire of the other of the lamps of an associated one of the respective pairs of 2 n lamps, whereby each of the normally open switches is coupled between the second lead-in wires of an associated one of the respective pairs of lamps. In operation, the common and selective terminal means are adapted for connection to a source of firing pulses, and each of the switches are responsive to the flashing of the directly connected lamp of an associated pair so as to connect the other lamp of that associated pair to the common terminal means. Preferably each of the switches comprises a solid state radiation switch located external of the lamps and forming part of an electrical circuit between the second lead-in wires of an associated pair of the lamps. Each switch is capable of conversion from a high electrical resistance to a low electrical resistance when exposed to radiation emitted from a flashlamp disposed adjacent to the switch, and each of the switches is disposed adjacent to the lamp of the associated pair which is directly connected between a selective terminal means and the common terminal means.

The lamps have a filament-type ignition means, and the resistance value of each lamp filament lies within a predetermined range of resistance values. In this manner, the firing circuit to which the lamp array terminal means are connected can perform a monitoring function by passing a current of limited predetermined maximum value through each unexpended flashlamp to derive alignment signals which function to align a flashlamp sequencing circuit to bypass inoperative flashlamps.

Accordingly, if the photoflash array comprises ten lamps operated from a common terminal means and five selective terminal means, a first firing pulse will cause ignition of the directly connected lamp of a first pair of lamps, whereupon the normally open radiation switch associated with that pair of lamps will be converted from a high to low resistance so as to directly connect the second of the first pair of lamps between the first selective terminal means and the common terminal means. Thereafter, the second firing pulse will bypass the expended first lamp and cause the second lamp to be ignited via the actuated radiation switch connected between that lamp and the common terminal means. The third firing pulse will then be applied to the second terminal means connected to the second pair of lamps to ignite the directly connected lamp thereof. This firing sequence proceeds through the remaining lamps and lamp pairs as described with respect to the first lamp pair.

An alternative approach for sequentially flashing pairs of lamps (one lamp at a time), in an array using one selective terminal per lamp pair together with a common circuit terminal, is described in a copending application Ser. No. 156,983, filed concurrently herewith and assigned to the present assignee. In the copending application, the common terminal means is connected to one lead-in wire of each of the 2 n lamps, and the normally open switch associated with each of the lamp pairs is coupled between the non-common lead-in wires of the pair. Thus, if there are ten lamps in a photoflash array operated from five selective terminals, one lamp of each pair is connected directly between a respective selective terminal and the common terminal, while a respective one of five normally open switches is coupled between the respective selective terminal and the second lamp of the pair. Hence, whereas in the copending application, lamp pairing is accomplished by an arrangement of normally open switches on the selective terminal side of the lamps, the present invention accomplishes the lamp pairing function by normally open switching on the common circuit side of the lamps. The present common circuit switching implementation has been found to be particularly advantageous in applications where the photoflash circuitry is required to be disposed on one side of a densely patterned printed circuit board employed in an extremely compact package configuration; if the normally open switches were located on the selective terminal side of the lamps in such a circuit application, the spatial constraints would undesireably require the use of conductors on both sides of the circuit board in order to dispose the radiation switches adjacent to selected lamps.

BRIEF DESCRIPTION OF THE DRAWING

The single FIGURE of the drawing is an electrical schematic circuit diagram of a preferred embodiment of the invention.

DESCRIPTION OF PREFERRED EMBODIMENT

Referring to the drawing, the photoflash lamp array illustrated schematically is provided with a common terminal 10 and five selective terminals 11-15 adapted for engagement with the socket contacts of a source of lamp firing pulses. For example, the terminals 10 and 11-15 may comprise conductive terminals on the tab of a printed circuit board such as that described in the aforementioned U.S. Pat. Nos. 3,598,985 and 3,757,643. The source of firing pulses for connection to these terminals may comprise an electronic circuit such as that described in U.S. Pat. No. 3,618,492, which may be incorporated in a camera or a flash attachment for use with the camera and adapted to generate low voltage pulses in synchronization with the actuation of a camera shutter mechanism.

The photoflash array includes a plurality of photoflash lamps 21-30, which may be of a conventional type, such as Sylvania type AG-1, each containing a filament 16 connected across a pair of lead-in wires 21a, 21b, etc., and adapted for initiating a flash of combustible material contained within the bulb.

In accordance with the invention, the array of ten lamps 21-30 are arranged in five pairs which are respectively associated with the five selective terminals 11-15. Each of the selective terminals 11-15 is connected in electrical circuit to a first lead-in wire of each of the lamps of a respective pair of lamps. That is, terminal 11 is connected to lead-in wires 21a and 22a of lamps 21 and 22, respectively; selective terminal 12 is connected to lead-in wires 23a and 24a of lamps 23 and 24, respectively; terminal 13 is connected to lead-in wires 25a and 26a of lamps 25 and 26, respectively; terminal 14 is connected to lead-in wires 27a and 28a of lamps 27 and 28, respectively, and the selective terminal 15 is connected to lead-in wires 29a and 30a of lamps 29 and 30, respectively.

Common terminal 10 is associated with all ten of the lamps 21-30 and directly connected in electrical circuit to a second lead-in wire of one of the lamps of each of the respective pairs of lamps. That is, common terminal 10 is directly connected to lead-in wires 21b, 23b, 25b, 27b and 29b of lamps 21, 23, 25, 27 and 29, respectively.

The array circuit further includes a plurality of flash-actuated, normally open switches 31-35 which are positioned external of and adjacent to respective ones of the lamps of the array which are directly connected between a selective terminal and the common terminal.

Each normally open switch is coupled in electrical circuit between the common terminal and the second lead-in wire of the non-directly-connected lamp of an associated pair of lamps. Further, each of these switches is coupled in electrical circuit between the second, or common circuit, lead-in wires of a respective pair of lamps. More specifically, a first switch 31 is coupled between common terminal 10 and lead-in wire 22b, and also between wires 21b and 22b, and disposed adjacent to the first lamp 21, as indicated by the dashed line arrow 41; a second switch 32 is coupled between common terminal 10 and lead-in wire 24b, and also between wires 23b and 24b, and associated with or positioned near the third lamp 23 as indicated by the dashed line arrow 42; a third switch 33 is coupled between common terminal 10 and lead-in wire 26b, and also between wires 25b and 26b, and disposed adjacent to the fifth lamp 25 as indicated by the dashed line arrow 43; a fourth switch 34 is coupled between common terminal 10 and lead-in wire 28b and also between wires 27b and 28b, and disposed adjacent to the seventh lamp 27, as indicated by the dashed line arrow 44; and a fifth switch 35 is coupled between common terminal 10 and lead-in wire 30b, and also between wires 29b and 30b, and positioned adjacent to the ninth lamp as indicated by the dashed line arrow 45.

The flash-actuated switches 31–35 may comprise radiation-responsive switches each having a pair of electrical contacts urged into contact with each other but held apart, for example, by a plastic material which melts or otherwise deforms when heated by the heat generated when the associated lamp flashes, so as to permit the contacts to close and electrically connect the next lamp in the array across respective selective terminal and the common terminal. For example, U.S. Pat. No. 4,087,849 describes a multilamp photoflash unit having radiant-energy-activated quick-connect switches each comprising a patch of heat shrinkable polymeric material attached to a circuit board and extending across an aperture therein to restrain a resilient movable contact in a spaced relation to a fixed circuit contact.

Alternatively, the radiation-responsive material may be a chemical or composition bridged between or encapsulating a pair of spaced-apart terminals and which is normally an insulator and becomes electrically conductive when heated by an associated flashing lamp, thereby forming an electrical connection to the next lamp to be flashed in the circuit. More specifically, consider a preferred application wherein the described photoflash array circuitry comprises conductor runs disposed in a pattern on a printed circuit board. In this case, the radiant-energy-activated, normally open connect switches 31–35 are in contact with and bridge across circuit runs that are connected to them. More specifically, each switch preferably comprises a solid state mass of material interconnected to a pair of spaced-apart electrical terminals in the circuit. The material for the connect switch is selected to be of the type initially having an open circuit or high resistance, the resistance thereof becoming converted to a lower value when the material receives radiation in the form of heat and/or light from a respective adjacent lamp, upon the lamp being flashed. One type of solid state switch which operated in this manner is described in U.S. Pat. No. 3,458,270 of Ganser et al, in which the use of silver oxide in a polyvinyl binder is taught as a normally open radiant energy switch. Upon radiant heating, the silver oxide decomposes to give a metallic silver residue which is electrically conductive.

A preferred switch composition for a photoflash array operated by low voltage firing pulses is described in a copending application Ser. No. 148,358, filed May 9, 1980, assigned to the present assignee, and comprises by dried weight 35–70% silver carbonate and/or silver oxide, 30–60% silver-coated glass beads, and 1–20% binder. Further modifications of the switch composition for facilitating control of the switch conversion time are described in a copending application Ser. No. 148,119, filed May 9, 1980, assigned to the present assignee.

The circuit functions as follows upon the terminals 10 and 11–15 being conncted to a source of firing pulses, for example, such as described in the previously mentioned patents 3,618,492 and 3,757,643. Assuming that none of the ten lamps of the unit have been flashed, upon occurrence of a first firing pulse across terminals 10 and 11, this pulse will be directly applied to the lead-in wires of the first connected flashlamp 21, whereupon the lamp 21 flashes and becomes an open circuit between its lead-in wires 21a and 21b. Heat and/or light radiation from the flashing first lamp 21 is operative via path 41 to activate the normally open switch 31. The radiation causes the normally open connect switch 31 to become a closed circuit (or a low value of resistance), thereby connecting common terminal 10 to the second lamp 22. By the time this occurs, the firing pulse should have diminished to a value insufficient to cause the second lamp 22 to flash.

In the electronic circuit described in the aforementioned U.S. Pat. No. 3,618,492, a monitoring function is provided wherein a current of limited predetermined maximum value is applied through each unexpended flashlamp. This monitoring current is generated prior to the ignition of a given one of the flashlamps. In this manner, alignment signals are derived which function to align the flashlamp sequencing circuit to bypass inoperative flashlamps.

This monitoring function is dependent upon the resistance across the lamp lead-in wires. Accordingly, the resistance values of lamp filaments are selected to lie within a predetermined range; typically, the filament in each lamp has a resistance value in the range of about 0.5 to 1.5 ohms. Thus, if the monitoring circuit senses a significantly higher resistance across the lamp lead-in wires, say, for example, higher than 50 ohms or 75 ohms, the selected terminal connected to that lamp will be bypassed, and the firing pulse will be applied across the operative lamp connected to the next successive selective terminal. On the other hand, if the monitoring circuit senses a resistance below the preselected level (that is, below 50 ohms or 75 ohms) a firing pulse will be applied to the selective terminal connected to that lamp.

In the present instance, with the first lamp 21 having been fired, but with the switch 31 having been closed, the monitoring circuit would continue to sense an unexpended lamp, namely, lamp 22, connected between selective terminal 11 and the common terminal 10. Accordingly, when the next firing pulse occurs, it is applied to the lead-in wires of the second lamp 22, via the now closed connect switch 31, whereupon the second lamp 22 flashes. Since both lamps 21 and 22 have now been fired, the monitoring circuit will cause the firing pulse alignment to bypass terminal 11 and proceed to terminal 12, the unexpended lamp 23 being directly connected between terminals 10 and 12. Hence, when the next firing pulse occurs, it is applied directly to the third lamp 23, thereby firing that lamp, whereupon the radiation from lamp 23 activates connect switch 32 to become essentially a closed circuit across its terminals. The next firing pulse will be applied via the now closed connect switch 32 to the lead-in wires of the fourth flashlamp 24, thereupon causing that lamp to flash. The foregoing pattern of operation then continues with respect to selective terminals 13, 14 and 15 to cause the sequential firing of lamps 25-30. Hence, in accordance with the invention a total of 2 n (10) lamps have been ignited from n (5) selective terminals together with a common terminal.

Accordingly, although the invention has been described with respect to specific embodiments, it will be appreciated that modifications and changes may be made by those skilled in the art without departing from the true spirit and scope of the invention. For example, various type of flash-actuated switches may be employed as elements 31-35; various types of circuit conductors and terminals may be employed; and n may be two or greater, i.e., the circuit approach is applicable to arrays of four lamps, six lamps, eight lamps, etc.

I claim:

1. A photoflash lamp array comprising, in combination:
   a plurality of 2 n flashlamps, each having first and second lead-in wires;
   a plurality of n selective terminal means, each associated with a respective pair of said 2 n lamps and electrically connected to the first lead-in wire of each of the lamps of said respective pair;
   a common terminal means associated with all of said 2 n lamps and directly connected in electrical circuit to the second lead-in wire of one of the lamps of each of said respective pairs of 2 n lamps; and
   a plurality of n normally open switches, each coupled in electrical circuit between said common terminal and the second lead-in wire of the other of the lamps of an associated one of said respective pairs of 2 n lamps, whereby each of said normally open switches is coupled between the second lead-in wires of an associated one of said respective pairs of 2 n lamps;
   said common and selective terminal means being adapted for connection to a source of firing pulses, and each of said switches being responsive to the flashing of the directly connected lamp of an associated pair so as to electrically connect the other lamp of said associated pair to said common terminal means.

2. The photoflash lamp array of claim 1 wherein each of said n switches is a radiation switch capable of conversion from a high electrical resistance to a low electrical resistance when exposed to radiation emitted from a flashlamp disposed adjacent to the switch, and each of said switches is disposed adjacent to the directly connected lamp of the associated pair of lamps to which the switch is electrically coupled.

3. The photoflash lamp array of claim 2 wherein each of said switches is a solid state radiation switch located external of the lamps and forming part of an electrical circuit between the second lead-in wires of an associated pair of said lamps.

4. The photoflash lamp array of claim 1 wherein each of said lamps has a filament connected across the lead-in wires thereof.

5. The photoflash lamp array of claim 4 wherein the resistance value of said lamp filament lies within a predetermined range of resistance values.

6. The photoflash lamp array of claim 4 wherein said filament of each of said lamps has a resistance value in the range of about 0.5 to 1.5 ohms.

7. The photoflash lamp array of claim 6 wherein each of said switches is a solid state radiation switch located external of the lamps and forming part of an electrical circuit between the second lead-in wires of an associated pair of said lamps.

8. The photoflash lamp array of claim 7 wherein $n=5$.

* * * * *